(12) United States Patent
Meier

(10) Patent No.: US 7,581,753 B2
(45) Date of Patent: Sep. 1, 2009

(54) RETAINING CLAMP

(75) Inventor: Ulrich Meier, Waedenswil (CH)

(73) Assignee: Hans Oetiker AG Maschinen- und Apparatefabrik, Horgen (CH)

( * ) Notice: Subject to any disclaimer, the term of this patent is extended or adjusted under 35 U.S.C. 154(b) by 658 days.

(21) Appl. No.: 10/537,255

(22) PCT Filed: Dec. 18, 2003

(86) PCT No.: PCT/EP03/14436

§ 371 (c)(1),
(2), (4) Date: Jan. 26, 2006

(87) PCT Pub. No.: WO2004/061355

PCT Pub. Date: Jul. 22, 2004

(65) Prior Publication Data

US 2006/0131842 A1 Jun. 22, 2006

(30) Foreign Application Priority Data

| Jan. 7, 2003 | (DE) | ................................. 203 00 278 |
| Jan. 27, 2003 | (DE) | ................................. 203 01 398 |
| Apr. 22, 2003 | (DE) | ................................. 203 06 587 |
| Jun. 27, 2003 | (DE) | ................................. 103 29 008 |

(51) Int. Cl.
*B60R 21/26* (2006.01)
*B65D 63/02* (2006.01)
*B65D 63/10* (2006.01)
*F16L 25/00* (2006.01)

(52) U.S. Cl. .................... 280/741; 24/20 R; 24/20 CW; 24/20 EE; 24/20 S; 285/420

(58) Field of Classification Search .............. 280/728.2, 280/741; 24/20 R, 20 CW, 20 EE, 20 S, 24/22, 23 R, 23 EE, 17 A, 274, 276; 285/135.5, 285/420, 134.1
See application file for complete search history.

(56) References Cited

U.S. PATENT DOCUMENTS

| 2,835,954 | A | * | 5/1958 | Dahl ........................... 24/279 |
| 3,905,623 | A | * | 9/1975 | Cassel ........................ 285/382 |

(Continued)

FOREIGN PATENT DOCUMENTS

DE  1 945 024 A1  8/1966

(Continued)

*Primary Examiner*—Toan C To
(74) *Attorney, Agent, or Firm*—Barnes & Thornburg LLP

(57) ABSTRACT

The invention relates to a retaining clamp (2) for securing objects, in particular gas storage cylinders (1) for airbags, having a clamping ring (3) which encircles the object and engages around the object in a clamping manner in particular by means of mechanical deformation upon installation (clamping means 11) and, in the process, bears with at least one contact surface (16) against the object, the contact surface (16) being provided at least in some regions with a roughening (17) which improves the retaining effect between the retaining clamp (2) and the object, and/or having a clamping securing bolt (press-in screw 5) which extends through an opening (40) of the clamping ring (3) and has a head (9) lying in the interior of the clamping ring (3), the head (9) having at least one rotation-preventing edge (38) which is arranged opposite the inside (36) of the clamping ring (3) in order to prevent rotation of the clamping securing bolt (press-in screw 5).

8 Claims, 12 Drawing Sheets

U.S. PATENT DOCUMENTS

| | | | | |
|---|---|---|---|---|
| 4,056,273 A | * | 11/1977 | Cassel | 285/337 |
| 4,261,600 A | * | 4/1981 | Cassel | 285/148.26 |
| 4,623,164 A | * | 11/1986 | Cassel et al. | 280/124.106 |
| 5,226,222 A | * | 7/1993 | Hanaoka et al. | 29/606 |
| 5,230,126 A | * | 7/1993 | Oetiker | 24/20 R |
| 6,123,369 A | | 9/2000 | Wagner et al. | 285/424 |
| 6,457,212 B1 | * | 10/2002 | Craig, Jr. | 24/20 R |
| 6,557,908 B2 | * | 5/2003 | Houtschilt et al. | 285/420 |
| 7,055,223 B2 | * | 6/2006 | Cassel et al. | 24/20 R |
| 7,252,310 B2 | * | 8/2007 | Amedure et al. | 285/419 |

FOREIGN PATENT DOCUMENTS

| | | |
|---|---|---|
| DE | 22 12 309 A1 | 9/1972 |
| DE | 24 41 297 A1 | 3/1976 |
| DE | 77 02 327 U1 | 7/1980 |
| DE | 198 18 179 A1 | 11/1999 |
| DE | 201 19 067 U1 | 8/2002 |
| EP | 0 389 309 A1 | 9/1990 |
| EP | 0 428 566 B | 12/1995 |
| EP | 0 794 379 A1 | 9/1997 |
| EP | 1 243 838 A | 9/2002 |
| FR | 1 104 928 | 11/1955 |
| FR | 2 497 546 | 7/1982 |
| GB | 303 865 A | 1/1930 |
| GB | 1 308 916 A | 3/1973 |

* cited by examiner

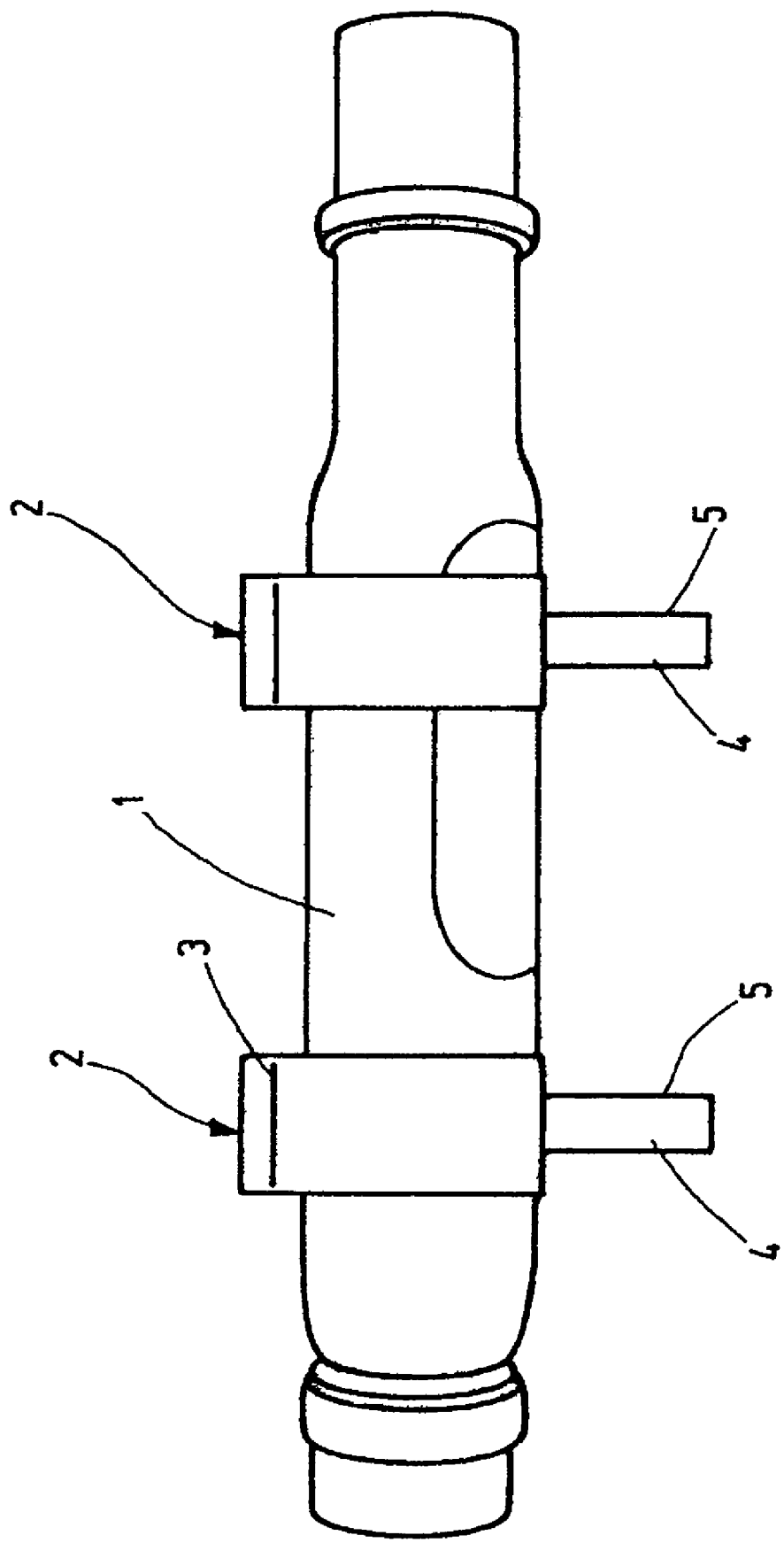

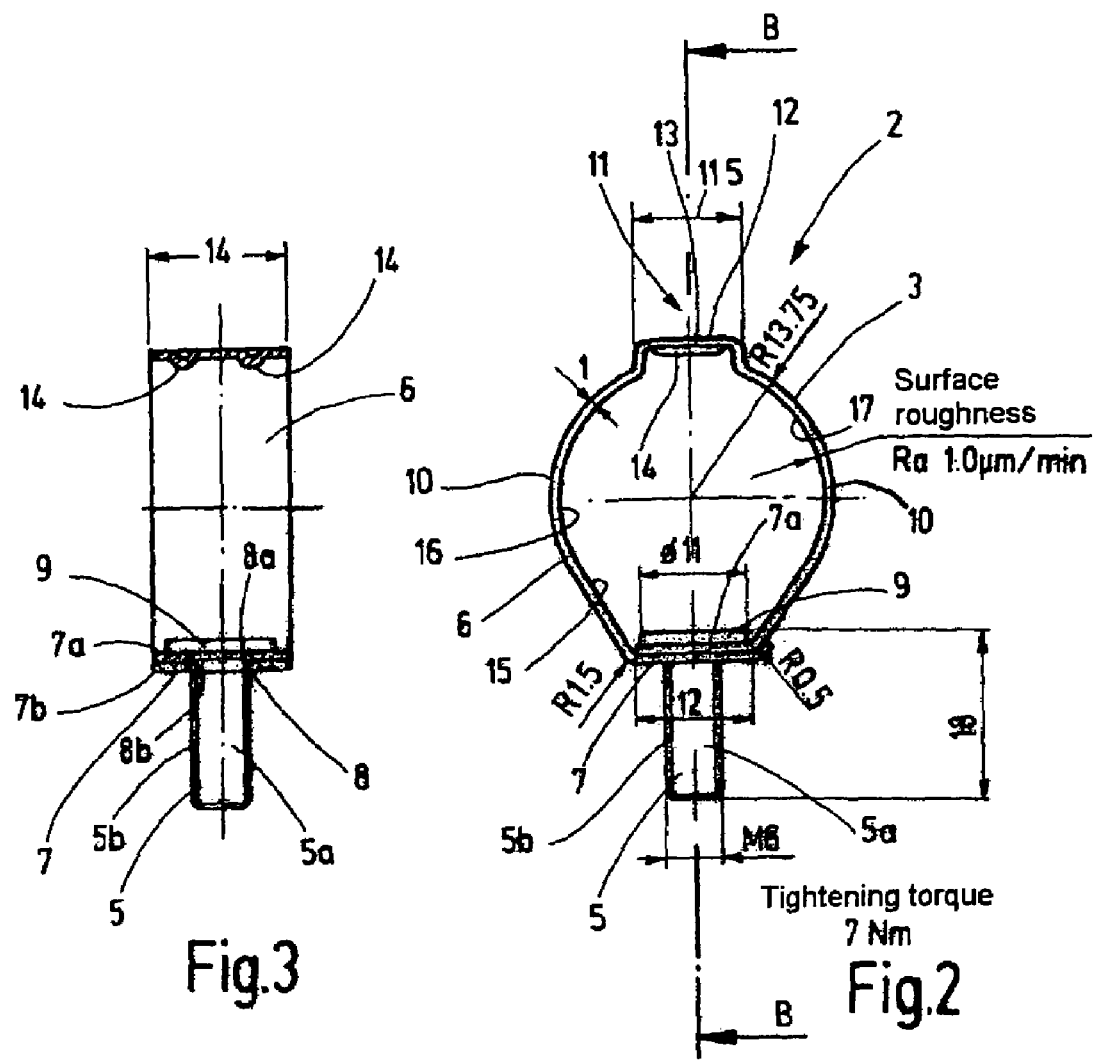

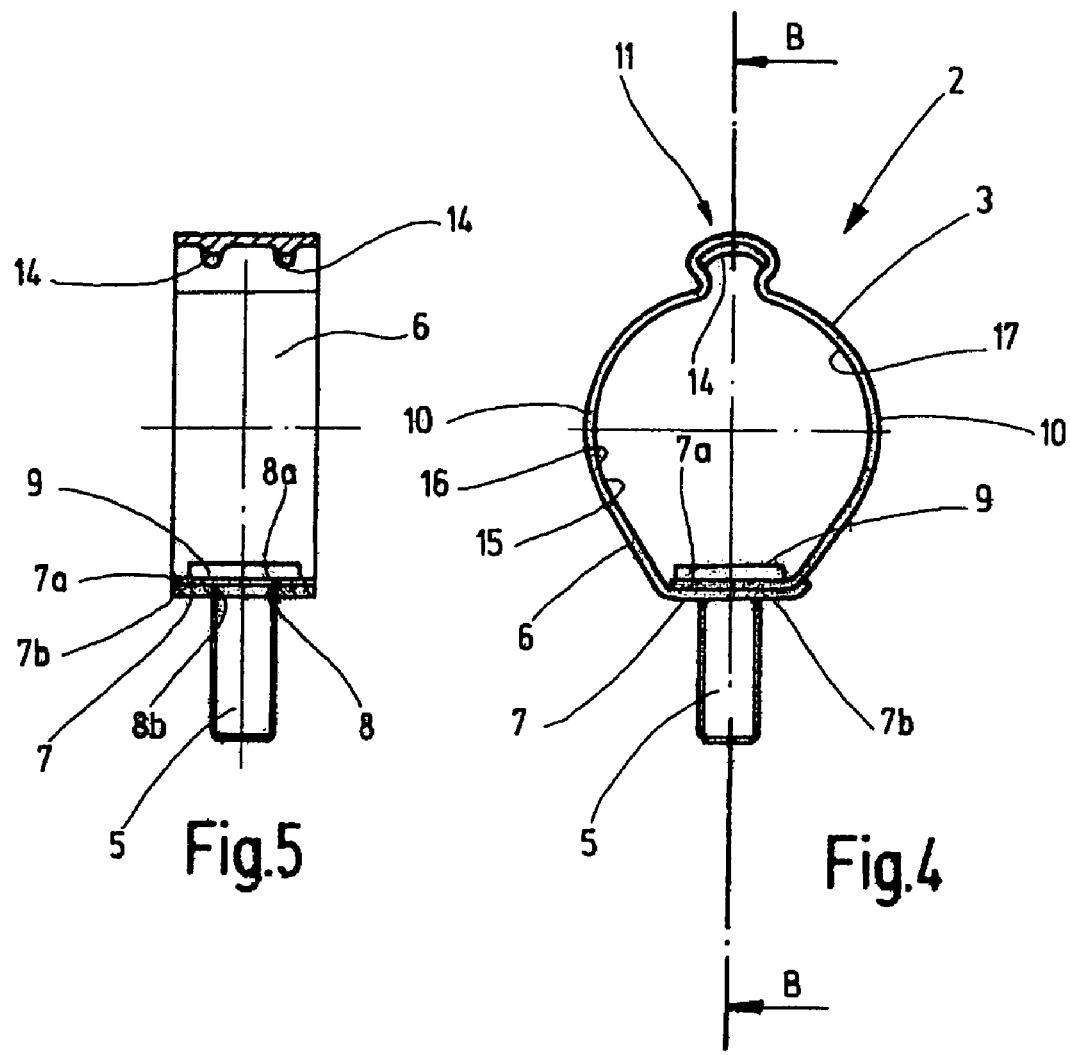

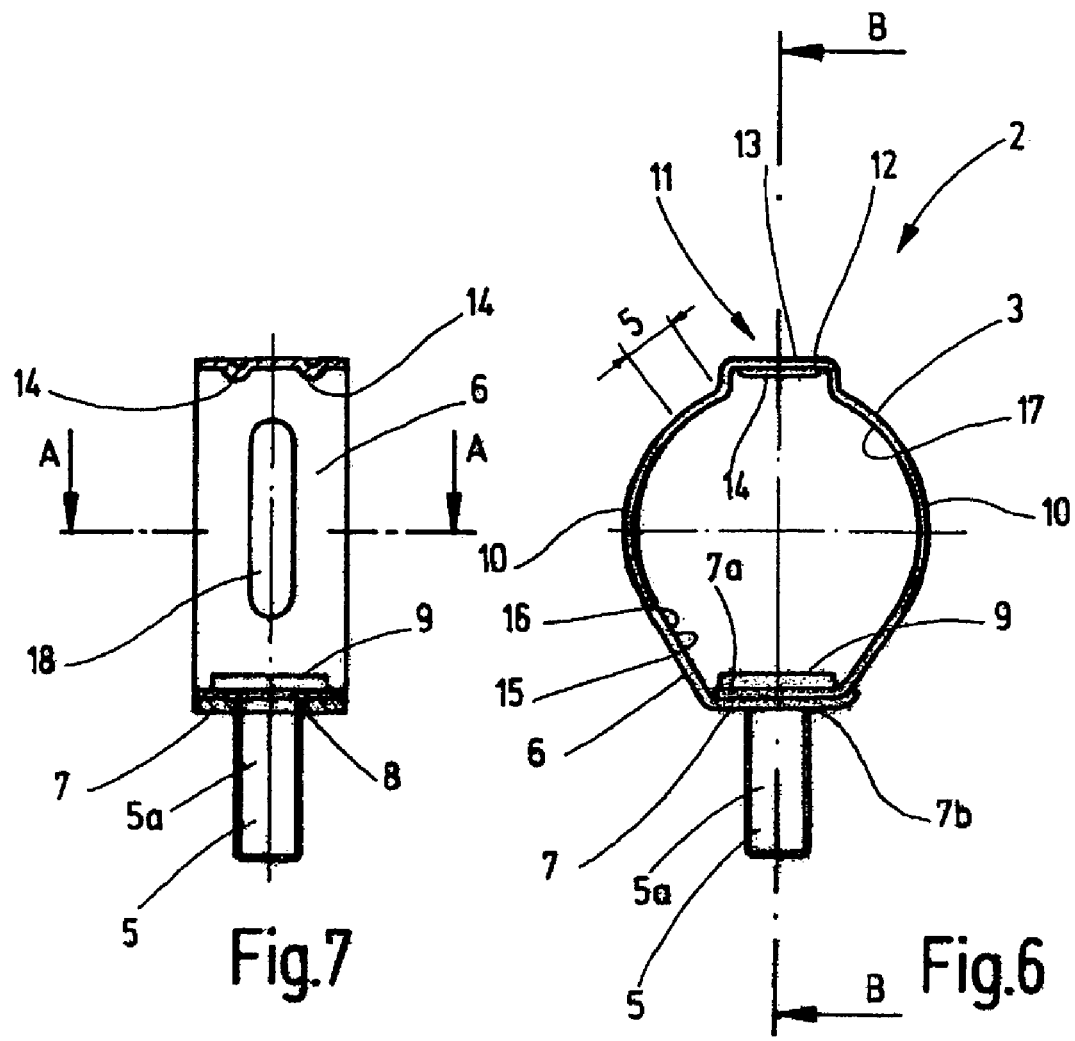
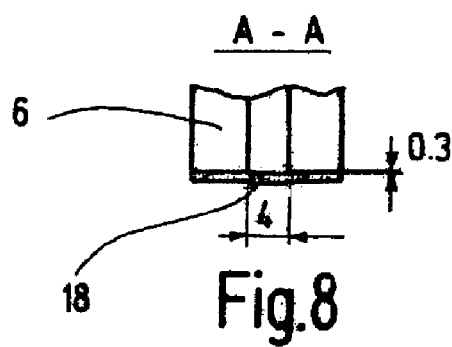

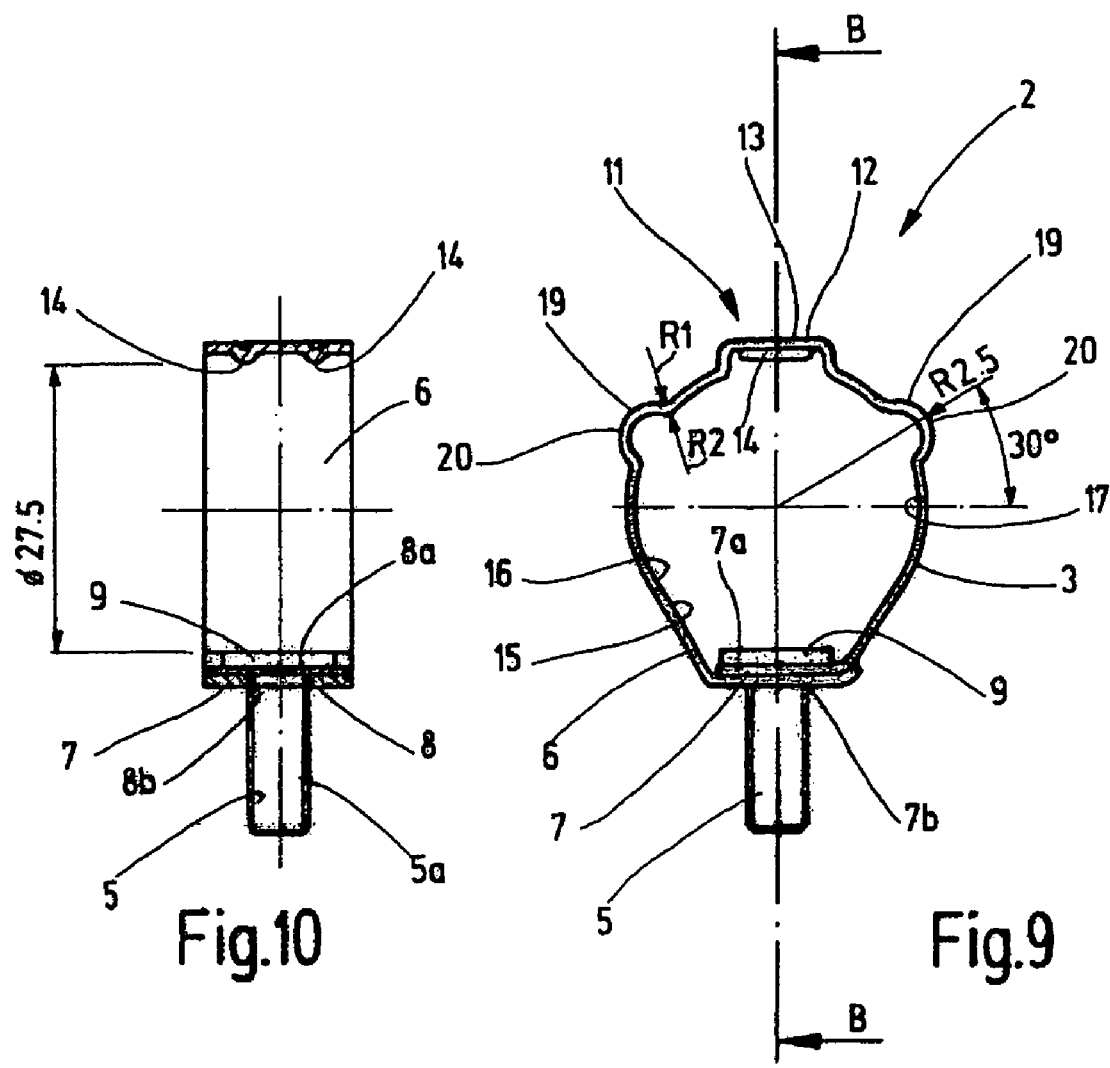

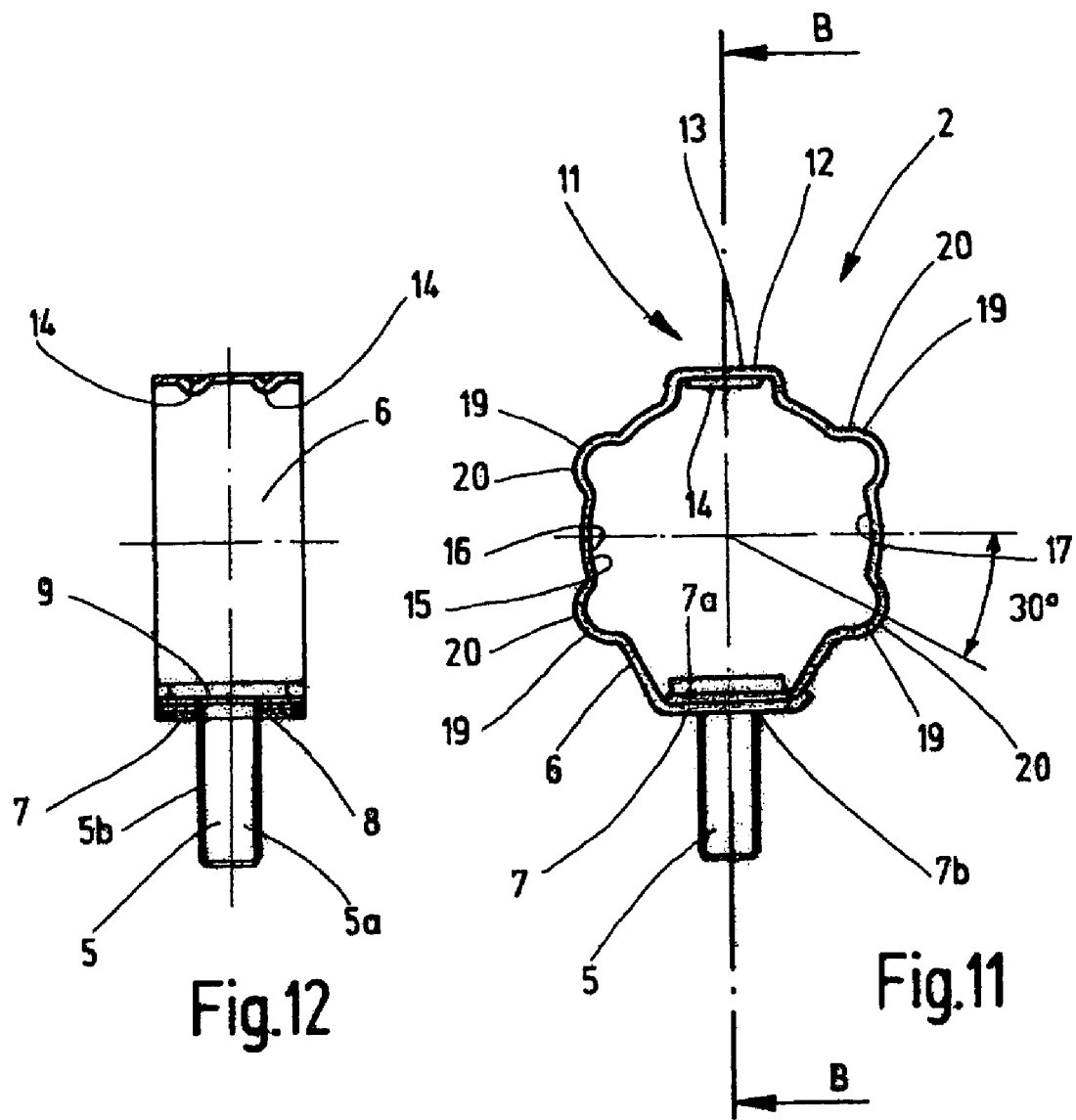

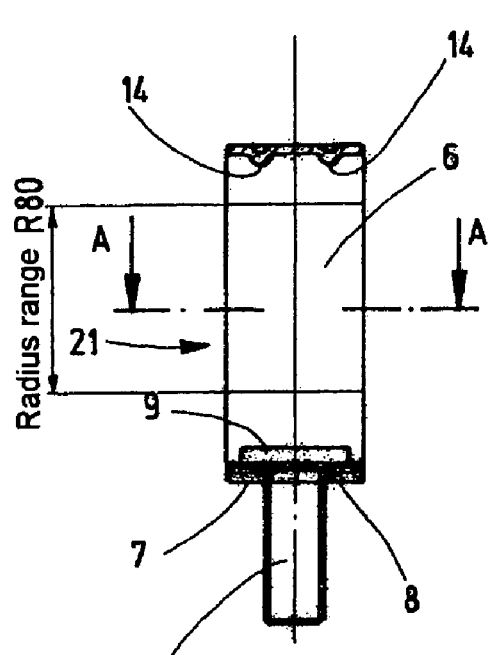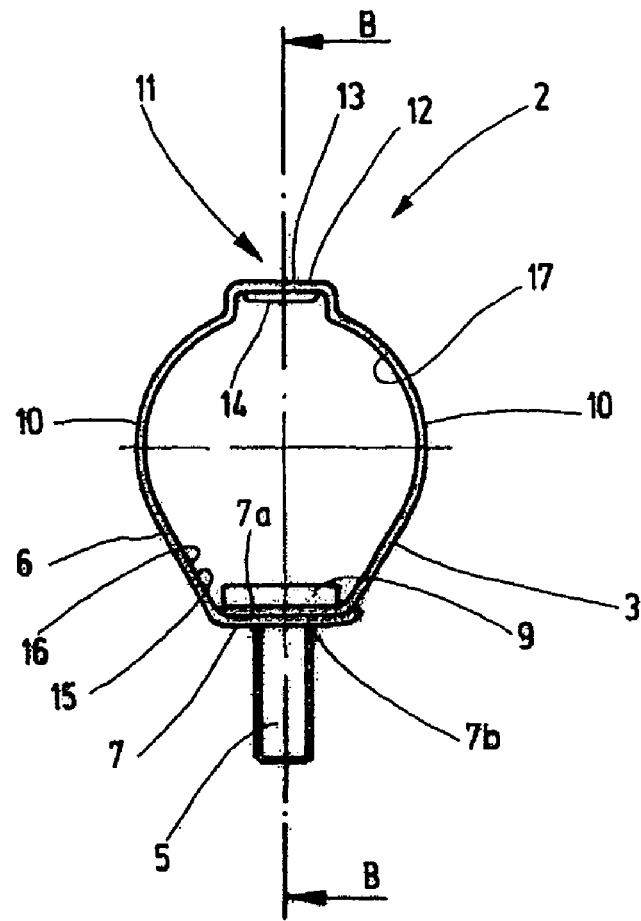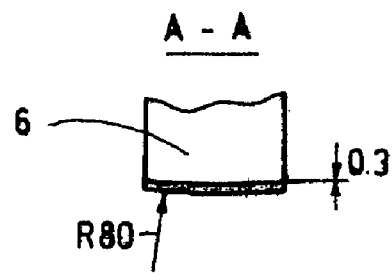

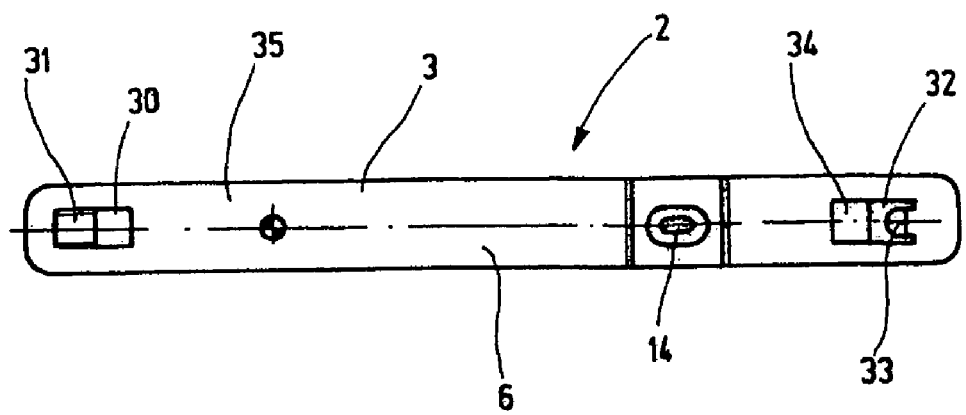
Fig.19
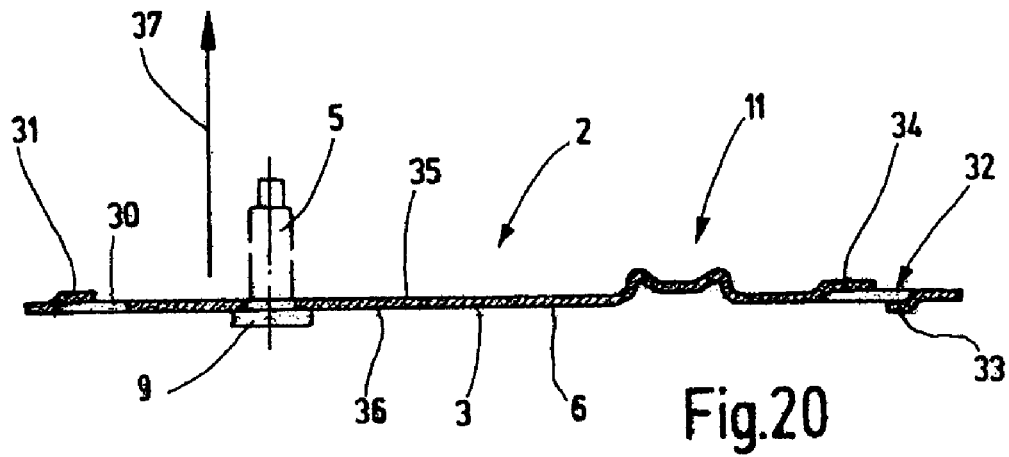
Fig.20
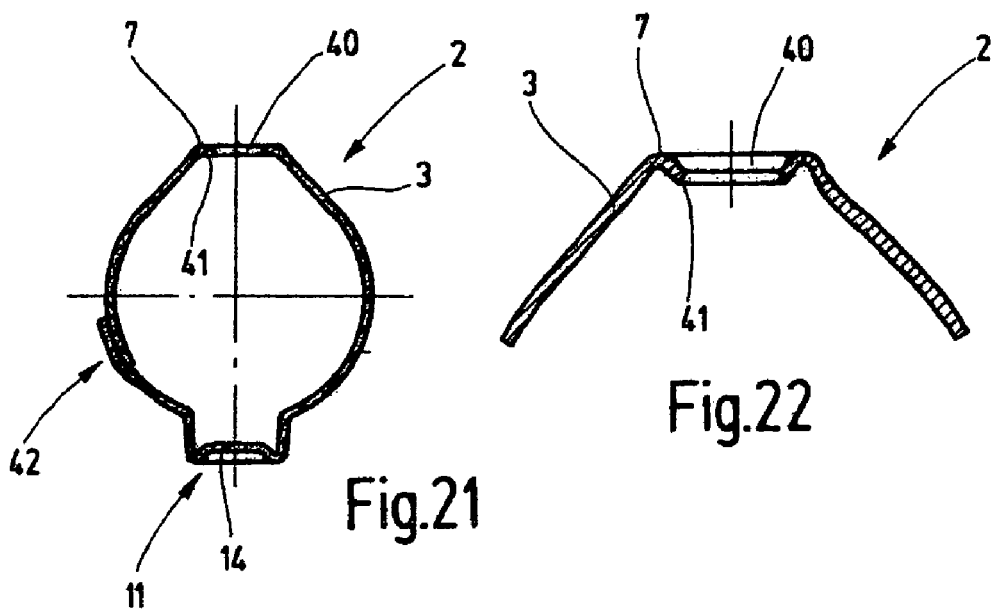
Fig.21
Fig.22

RETAINING CLAMP

BACKGROUND AND SUMMARY OF THE INVENTION

The invention relates to a retaining clamp for securing objects, in particular gas storage cylinders for airbags.

In order to secure objects, in particular cylindrical gas storage cylinders for airbags, the invention makes use of a retaining clamp which preferably has an encircling clamping ring designed as a sheet-metal punched part. Arranged on the clamping ring are a clamping means and a securing means, of which the former serves to securely clamp the clamping ring around the object while the latter serves to secure the retaining clamp and the object fixed by the latter in a clamping manner. In the case of securing gas storage cylinders for motor vehicle airbags, in particular side airbags, the retaining clamp is secured on a suitable vehicle part, for example on the chassis or on the door construction, by means of the securing means, in particular a press-in screw.

The arrangement is implemented in such a manner that the clamping ring of the retaining clamp encircles the object in the manner of a hose band clip, the encircling leading, after the object is securely clamped, to radial forces which fix the object with respect to the clamping ring and therefore with respect to the securing means. In order to produce a clamping force of sufficient magnitude between the clamping ring of the retaining clamp and the object and thereby to improve the holding effect, according to the invention a roughening is formed, at least in some regions, on at least one contact surface with which the retaining clamp bears against the object to be held. This roughening increases the coefficient of static friction between the contact surface and that surface of the object which bears against the contact surface, which makes it possible to more securely retain the object. This is important in particular in vehicle construction, since, if there is an accident-induced deformation of the vehicle, the gas storage cylinder, which may constitute the object to be held, has to be securely fixed in order to ensure correct activation of an associated airbag.

In a preferred refinement of the invention, provision is made for the roughening to have a surface roughness of at least approximately 1 μm. The roughening can be produced, for example, by the contact surface being machined by sandblasting using a sharp-edged, particulate material, the hardness of which is greater than the hardness of the clamping rings, so that the particles, when they strike against the contact surface, cause it to be deformed. As an alternative, the roughening may also be brought about by stamping the contact surface with a suitable stamping tool, either during punching of the retaining clamp, which is preferably designed as a sheet-metal part, or by using a metal sheet which has already been provided during the rolling process with a rough surface.

According to a further preferred refinement of the invention, the clamping ring has at least one stiffening bead which is surrounded by a contact surface and is pressed outward away from the surface of the object. Stiffening beads of this type make it possible, firstly, to reinforce the clamping or retaining force applied by the clamping ring on the object and, secondly, as a consequence of the clamping ring being stiffer, to counteract a deformation caused by external forces, for example accident-induced forces. The reinforcing beads preferably have an elongate shape with a longitudinal axis which extends in the circumferential direction of the clamping ring, and can expediently extend in each case over a circumferential angle of 60 to 120° on opposite sides of the object.

As an alternative or in addition, the clamping ring can have at least one convexity, i.e. a cross-sectionally arcuate stamping of the clamping ring with an apex line which is formed transversely with respect to the peripheral or circumferential direction thereof and below which the clamping ring does not bear against the surface of the object.

A further preferred refinement and/or variant of the invention makes provision for the securing of the retaining clamp to take place by means of a clamping securing bolt, which is preferably designed as a press-in screw, extends through an opening of the clamping ring, has a head lying in the interior of the clamping ring and a stem which protrudes outward through the opening, a rotation of the clamping securing bolt with respect to the clamping ring being prevented by the head having at least one rotation-preventing edge which lies at a short distance opposite part of the inside of the clamping ring.

The head of the clamping securing bolt preferably has a multi-edged contour and is expediently provided on diametrically opposite sides with two mutually parallel rotation-preventing edges which are arranged on both sides of a part of the inside of the clamping ring that serves as a seat for the lower side of the head, and lie there at a short distance opposite two sections of the clamping ring that are adjacent to the seat and are bent inward. The best is for the head to have an outline in the form of a square or other regular polygon with parallel sides, so that it can be aligned with respect to the seat in any desired rotational position of two or more rotational positions, in which two side surfaces of the head that serve as rotation-preventing edges lie opposite those sections of the clamping ring which are adjacent to the seat and are bent inward.

In order to close the clamping ring, which is preferably produced by punching out and bending a sheet-metal strip, the two opposite end portions of the sheet-metal strip can be provided in each case with an opening for the clamping securing bolt and can be placed one above the other with aligned openings in order to guide the clamping securing bolt through the openings and, as a result, to connect the end portions of the sheet-metal strip to each other in this region.

As an alternative, however, provision may also be made for the sheet-metal strip to have just a single opening for the clamping securing bolt and for the ends of the sheet-metal strip to be connected to each other at a distance from the opening, preferably by the two end portions being hooked together in such a manner that, after being securely clamped on the object, they can no longer be detached from each other.

BRIEF DESCRIPTION OF THE DRAWINGS

In the following text, the invention is explained in greater detail with reference to a plurality of exemplary embodiments which are illustrated in the drawing, in which:

FIG. 1 shows a side view of a gas storage cylinder which is held by two retaining clamps according to a first embodiment of the invention;

FIG. 2 shows a front view of one of the retaining clamps from FIG. 1 in an undeformed state;

FIG. 3 shows a partially cutaway view of the retaining clamp along the line B-B from FIG. 2;

FIGS. 4 and 5 respectively show a front view and a partially cutaway view of the retaining clamp corresponding to FIGS. 2 and 3, but in a deformed state after being securely clamped on the gas storage cylinder (not illustrated);

FIGS. 6 and 7 respectively show a front view and a partially cutaway view of a further embodiment of a retaining clamp according to the invention corresponding to FIGS. 2 and 3;

FIG. 8 shows a sectional view along the line A-A from FIG. 7;

FIGS. 9 and 10 respectively show a front view and a partially cutaway view of yet another embodiment of a retaining clamp according to the invention, corresponding to FIGS. 2 and 3;

FIGS. 11 and 12 respectively show a front view and a partially cutaway view of yet another embodiment of a retaining clamp according to the invention corresponding to FIGS. 2 and 3;

FIGS. 13 and 14 show a front view and a partially cutaway view of yet another embodiment of a retaining clamp according to the invention corresponding to FIGS. 2 and 3;

FIG. 15 shows a sectional view along the line A-A from FIG. 14;

FIG. 19 shows a plan view of a sheet-metal band for producing a clamping ring of yet another embodiment of a retaining clamp according to the invention;

FIG. 20 shows a longitudinal sectional view along the centre axis of the sheet-metal band from FIG. 19 after the fitting of a press-in screw;

FIG. 21 shows a view corresponding to FIG. 20 after the sheet-metal band is bent to form the clamping ring, but without the press-in screw;

FIG. 22 shows an enlarged illustration of part of FIG. 21;

DETAILED DESCRIPTION OF THE INVENTION

Figure 17:
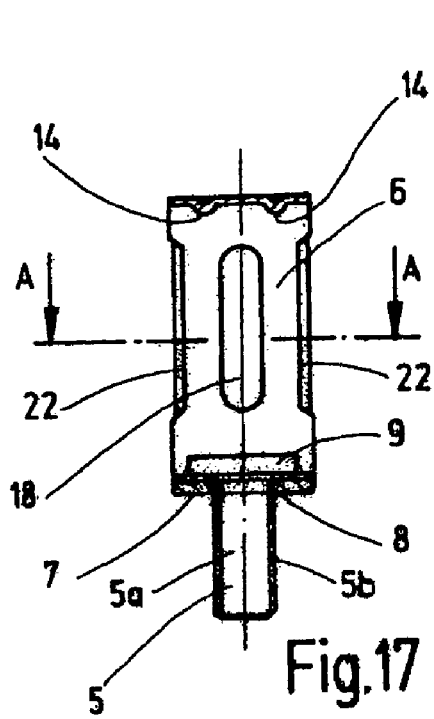
FIGS. 16 and 17 respectively show a front side view and a partially cutaway view of yet another embodiment of a retaining clamp according to the invention corresponding to FIGS. 2 and 3.

The drawings illustrate the invention with reference to various exemplary embodiments, specifically, FIG. 1 shows a view of a gas storage cylinder 1 having two retaining clamps 2 which serve to secure the gas storage cylinder 1 on a body part of a motor vehicle.

The gas storage cylinder 1 can be, for example, the gas storage cylinder of a side airbag of a passenger vehicle (not illustrated) which is secured realisably on a door frame or another suitable body part of the passenger vehicle by means of the two retaining clamps 2.

Each of the two retaining clamps 2 has a clamping ring 3, which surrounds the gas storage cylinder 1, which is essentially cylindrical in cross section, in the circumferential direction in the manner of a hose band clip and is pressed against the circumferential surface of the gas storage cylinder 1. The clamping ring 3 is connected fixedly to a securing means 4 which serves to secure it on the body part and is in the form of a press-in screw 5. A stem 5a of the press-in screw 5 has an external thread 5b onto which a nut (not illustrated) or a plurality of nuts (not illustrated) can be screwed after the stem 5a has been plugged through a passage hole in the body part.

Tightening of the nut or nuts enables the retaining clamp 2 to then be secured fixedly on the body part, so that the gas storage cylinder 1 is securely fixed with respect to the body part, even in the event of an accident of the motor vehicle, by the two retaining clamps 2, which are arranged at an axial distance.

FIG. 2 shows a first exemplary embodiment of the retaining clamp 2 which comprises the clamping ring 3 and the press-in screw 5.

As in all of the exemplary embodiments of this application, the clamping ring 3 consists of a sheet-metal strip or sheet-metal band 6 which is shaped, preferably by punching and bending, to form the clamping ring 3. Consequently, the clamping ring 3 of the retaining clamp 2 is a sheet-metal part, in particular a bent punched part of elastically deformable sheet metal, i.e. sheet metal which is plastically deformed only when relatively large forces are applied. The sheet-metal band 6 has a base region 7 which is provided with a passage opening 8 for the press-in screw 5, which is produced separately from the clamping ring and, before or after the bending of the sheet-metal band 6 to form the clamping ring, is connected thereto in a rotationally fixed and axially non-displaceable manner, for example by compression or pressing it in.

The press-in screw 5 essentially comprises the stem 5a and a head 9 which is situated in the interior of the clamping ring 3. The press-in screw 5 is captively fixed in the passage opening 8 of the clamping ring 3 by means of a compressing collar (not illustrated specifically) arranged on the outside of the base region 7.

In the exemplary embodiments of FIGS. 1 to 15, the base region 7 is formed by the two mutually overlapping planar end portions 7a, 7b of the sheet-metal band 6, which sections bear with their adjacent wide sides against each other in a sheet-like manner. The two end portions 7a, 7b of the sheet-metal band 6 are respectively provided with a passage opening 8a, 8b for the stem of the press-in screw 5, which passage openings 8a, 8b are aligned with each other and form the passage opening 8 after the sheet-metal band 6 has been bent annularly to form the clamping ring 3.

As is best illustrated in FIGS. 2, 4, 6, 9, 11, 13 and 16, the sheet-metal band 6, starting from those sides of the base region 7 which lie opposite in the circumferential direction of the clamping ring 3, extends in each case obliquely upward in order, above the base region 7, to provide, between the latter and the cylindrical circumferential surface of the gas storage cylinder 1, space for the head 9 of the press-in screw 5.

Whereas that end portion 7a of the sheet-metal band 6 which is situated on the inside in the base region 7 is rectilinear as far as its front end and strikes through the latter against the base of the following, oblique region of that end portion 7b of the sheet-metal band 6 which is situated on the outside, said latter end portion 7b is bent over upward shortly before its front end, so that it bears there from the outside against the base of the oblique region of that end portion 7a of the sheet-metal band 6 which is situated on the inside. This measure ensures that the two passage openings 8a and 8b in the opposite end portions of the sheet-metal band 6 are aligned with each other when the sheet-metal band 6 is bent to form the clamping ring 3.

In the exemplary embodiments in FIGS. 2, 4, 6, 9 and 16, the clamping ring 3 merges, following the two oblique regions, in each case into a section 10 in the shape of a circular arc. This is adjoined by a clamping means 11 which lies diametrically opposite the base region 7 and is formed by a zone 12 of the clamping ring 3, which zone has, in the side view of FIGS. 2, 4, 6, 9, 11, 13 and 16, a profile in the form of an inverted U that is open toward the interior of the clamping ring. In order to mechanically stiffen the clamping means 11, the yoke or the base 13 of the U-shape zone 12 has at least one inwardly protruding stiffening web 14 which is preferably formed by an elongate, pump-shaped stamping of the sheet-metal band 6. It can be gathered from FIGS. 3, 5, 7, 10, 12, 14 and 17 that preferably two such stiffening webs 14 are formed on the yoke or the base 13.

The inside 15 of the clamping ring 3, which side faces the gas storage cylinder 1, is provided in its entirety or at least in some regions with a roughening 17, the surface roughness in the regions provided with the roughening 17 preferably being at least 1 μm. Where the roughening extends over the entire inside 15 of the clamping ring 3, it is preferably produced by the sheet-metal band 6 being punched from a metal sheet on which at least one surface is roughened, for example by the use of rollers having an appropriate surface roughness. Where the roughening 17 is provided essentially only on 1 or more contact surfaces 16 in which the clamping ring 3 is pressed against the surface of the gas storage cylinder 1, the roughening 17 can be produced with the aid of abrasive particles with which the contact surfaces, which are originally smoothed, are sandblasted or "ground".

In order to produce the retaining clamp 2 of FIGS. 1 to 15, the sheet-metal band 6 is first of all punched out and bent to form the clamping ring 3 before the stem 5a of the press-in screw 5 is plugged from the inside through the passage openings 8a and 8b of the end portion 7a and 7b of the sheet-metal band 6, which sections overlap each other in the base region 7, until the head 9 bears with its lower side against the base region 7. The compressing collar is then deformed on the outside of the base region 7 in order to captively secure the press-in screw 5 on the clamping ring 3.

For securing it on the gas storage cylinder 1, the undeformed retaining clamp 2 is first of all pushed axially onto the gas storage cylinder 1. The clamping means 11 is then deformed, as illustrated in FIG. 4, by means of a suitable pair of deformation tongs in order to securely clamp the clamping ring 3 on the circumference of the gas storage cylinder 1. In the process, the two limbs of the U-shaped zone 12 are pressed together at their lower ends by bringing them together, with the base 13 being curved outward in an arcuate manner and deformed together with the stiffening webs 14, as illustrated in FIG. 4. The bringing-together of the lower ends of the two limbs of the U-shaped zone 12 shortens the length of the clamping ring 3 until the latter bears in the region of the contact surfaces 16 against the gas storage cylinder 1 and, as a consequence of a tensile stress produced by the deformation in the clamping ring 3, is pressed against the circumferential surface of the gas storage cylinder 1. The stressing force exerted on the object to be held, namely on the gas storage cylinder 1, and the roughening 17 on the contact surfaces 16 mean that the measured force which is required to remove the retaining clamp 2 from the gas storage cylinder is more than 650 N.

The exemplary embodiment of a retaining clamp 2 that is illustrated in FIGS. 6 to 8, corresponds essentially to the exemplary embodiment of FIGS. 1 to 5. The sole difference is that an elongate stiffening bead 18 is formed in each case in the region of the two arcs 10 and extends over an angle of 80 to 90°, with its longitudinal excess extending in the circumferential direction of the clamping ring 3. The width of the stiffening bead 18 is approximately 25 to 30% of the width of the sheet-metal band 6. In the region of the bead 18, the material of the sheet-metal band 6 is curved outward slightly, with the result that it protrudes in the centre of the stiffening bead 18 by approximately 0.3 from the circumferential surface of the gas storage cylinder 1. The stiffening bead 18 increases the moment of bending resistance of the sheet-metal band 6 in the longitudinal direction thereof and, as a result, brings about a stiffening of the same. In addition, however, it also increases the restoring force of the clamping ring 3, which is elastically deformed in the tightening process, with the result that said clamping ring is pressed against the circumferential surface of the gas storage cylinder 1 with a higher clamping force.

FIGS. 9 and 10 show a further exemplary embodiment of a retaining clamp 2, in which convexities 19 are formed in the upper region of the encircling sheet-metal band 6, approximately in the centre of the sections 10 which are arranged on both sides of the clamping means 11 and are in the shape of a circular arc, the convexities being in the form of a convex, outwardly protruding, approximately semicircular arc 20, the apex lines of which, in contrast to the apex lines of the stiffening webs 14 and of the stiffening beads 18 that extend in the circumferential direction, extend transversely with respect to the circumferential direction of the clamping ring 3 or transversely with respect to the longitudinal axis of the sheet-metal band 6. During the plastic deformation of the clamping means 10 as the retaining clamp 2 is being securely clamped on the gas pressure cylinder 1, the convexities 19 are somewhat expanded under elastic deformation, thus enabling, as a consequence of their elastic restoring forces, the pressing of the clamping ring 3 against the gas pressure cylinder 1 in the region of the contact surfaces 16 and therefore the elastic clamping action of the retaining clamp 2 to be reinforced. At a radius of the clamping ring of 13.75 mm, the radius of curvature of the convexities is 2.5 mm.

In contrast to the exemplary embodiment of FIGS. 9 and 10, in the case of the retaining clamp 2 which is illustrated in FIGS. 11 and 12, two further convexities 20 are provided in the lower region of the clamping ring 3 between the oblique regions and those sections 10 of the sheet-metal band 6 which are in the shape of a circular arc. As in the previously described exemplary embodiments, the convexities 19, 20 are symmetrical to a plane extending through the centre of the clamping means 11 and the base region 7.

FIGS. 13 to 15 show a further exemplary embodiment of a retaining clamp 2, in which the sheet-metal band 6 is not rectilinear or planar in cross section (FIG. 15) in the region of the arcs 10, but rather is curved outward slightly convexly with a relatively large radius. The clamping ring 3 is pressed there in the region of its longitudinal side edges against the circumferential surface of the gas storage cylinder 1 while, along its longitudinal axis, it is at a distance of a few tenths of a millimeter, preferably of 0.3 mm, from the circumferential surface of the gas storage cylinder 1. The radius of curvature of the curve is a multiple of the radius of curvature of the arcs 10 of the clamping ring 3, preferably 80 mm given a radius of curvature of the arcs 10 of 13.75 mm. As already described above for the convexities 19, the radius of curvature of these curves is somewhat enlarged when the clamping ring 3 is pressed against the surface of the gas storage cylinder 1. This in turn leads, as a consequence of the restoring forces of the elastically deformed, slightly curved band sections, to the retaining force of the clamping ring 3 on the surface of the gas storage cylinder 1 being improved. At the same time, the curvature enlarges the moment of bending resistance in the longitudinal direction of the sheet-metal band 6 and therefore also the restoring force of the clamping ring 3, which is elastically deformed after the tightening process, in a similar manner to that previously described with the reinforcing bead 18 in the case of the exemplary embodiment of FIGS. 3 to 6.

In principle, the regions which have curved outward in the cross section of the sheet-metal band 6 could also extend over the entire length of the clamping ring 3, but they deploy their full action only in the region of the contact surfaces 16 where the clamping ring 3 is pressed, after being firmly clamped, against the surface of the gas storage cylinder 1.

Figure 18:
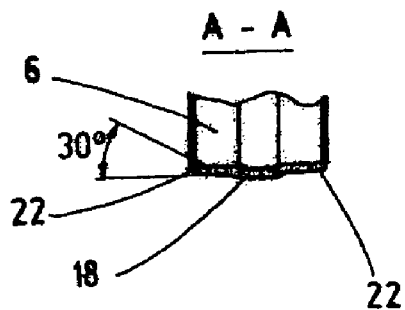
FIG. 18 shows a sectional view along the line A-A from FIG. 17.
Figure 16:
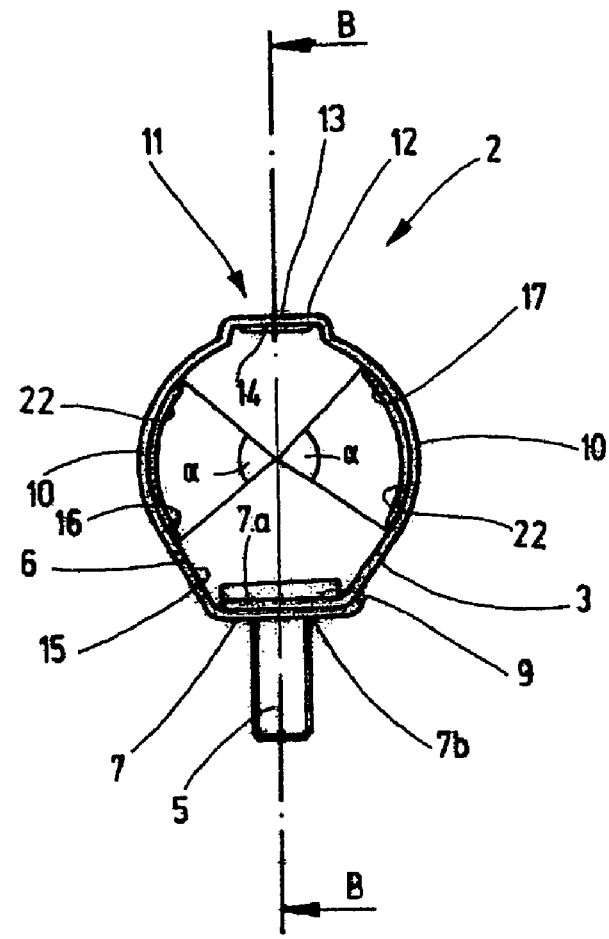

FIGS. 16 to 18 show yet another exemplary embodiment of a retaining clamp 2 which, in the same manner as the retaining clamp from FIGS. 6 to 8, has a respective stiffening bead 18 in the region of the approximately diametrically opposite, arcuate sections 10. In addition to this, the longitudinal side edges of the clamping ring 3 are flanged inward slightly, at 22, in the region of the arcuate sections 10, i.e. flanged towards each other in the direction of the centre axis of the sheet-metal band 6. The flangings 22 extend in each case on both sides of the stiffening beads 18 over an angular pitch a of the encircling sheet-metal band 6, they being aligned parallel to the longitudinal axis of the adjacent stiffening bead 18, having approximately the same length as the latter and being arranged at an angular distance from the base region 7 and from the clamping means 11. In this case, the angular pitch α is, in particular, between 30° and 120°, preferably between 60° and 100°. By means of the increase in the moment of bending resistance and therefore in the restoring forces of the clamping ring 3, which is elastically deformed after being firmly clamped, the stiffening beads 18 and the flangings 22 likewise result in an improvement in the clamping action of the retaining clamp 2, as already described for the exemplary embodiment of FIGS. 6 to 8.

A common feature of all of the exemplary embodiments of FIGS. 1 to 18 is that the inside 15 of the sheet-metal band 6 is provided with a roughening 17, at least in the region of the contact surfaces 16, in order to ensure an even better grip of the retaining clamp 2 on the object which is to be held.

Figure 23:
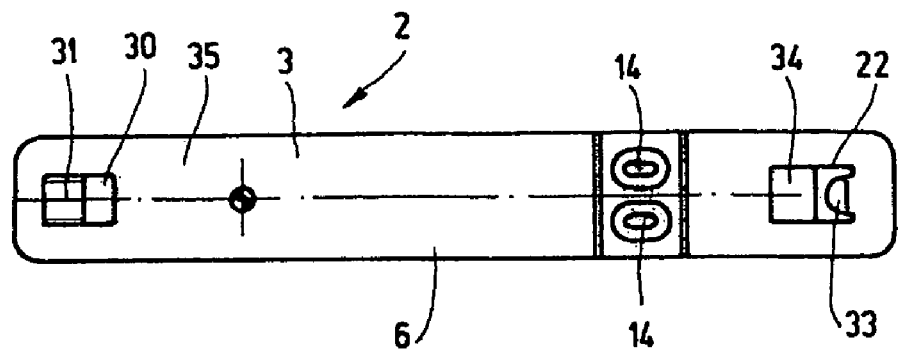
FIG. 23 shows a plan view of a sheet-metal band for producing a clamping ring of yet another embodiment of a retaining clamp according to the invention.
Figure 24:
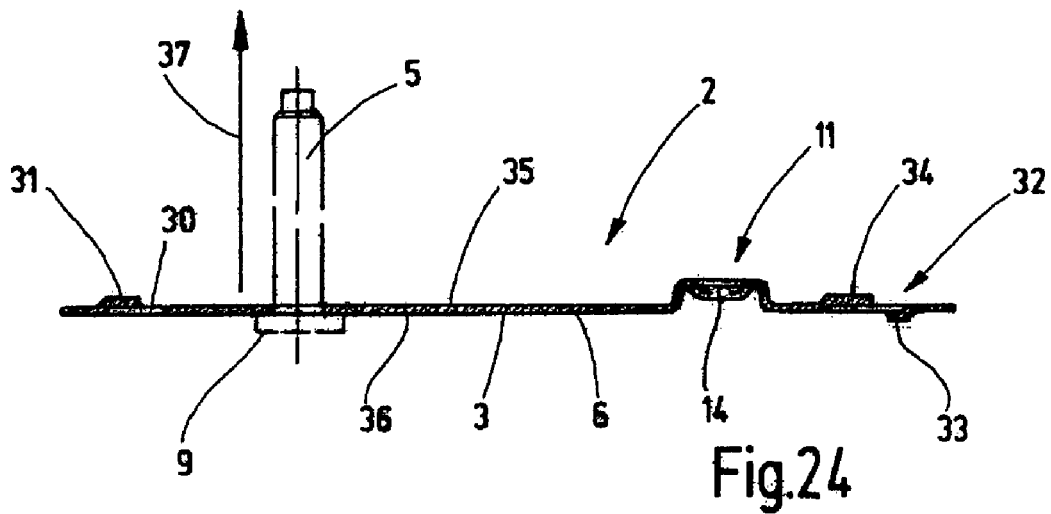
FIG. 24 shows a sectional view along the centre axis of the sheet-metal band from FIG. 23 after the fitting of a press-in screw.
Figures 25, 26:
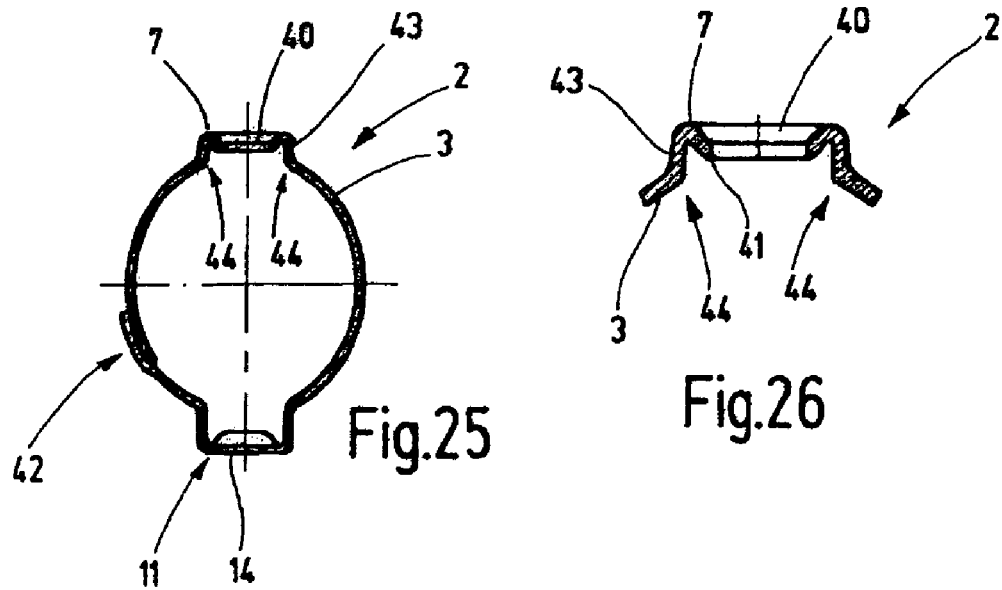
FIG. 25 shows a view corresponding to FIG. 24 after the sheet-metal band is bent to form the clamping ring, but without the press-in screw.
FIG. 26 shows an enlarged illustration of part of FIG. 25.
Figure 27:
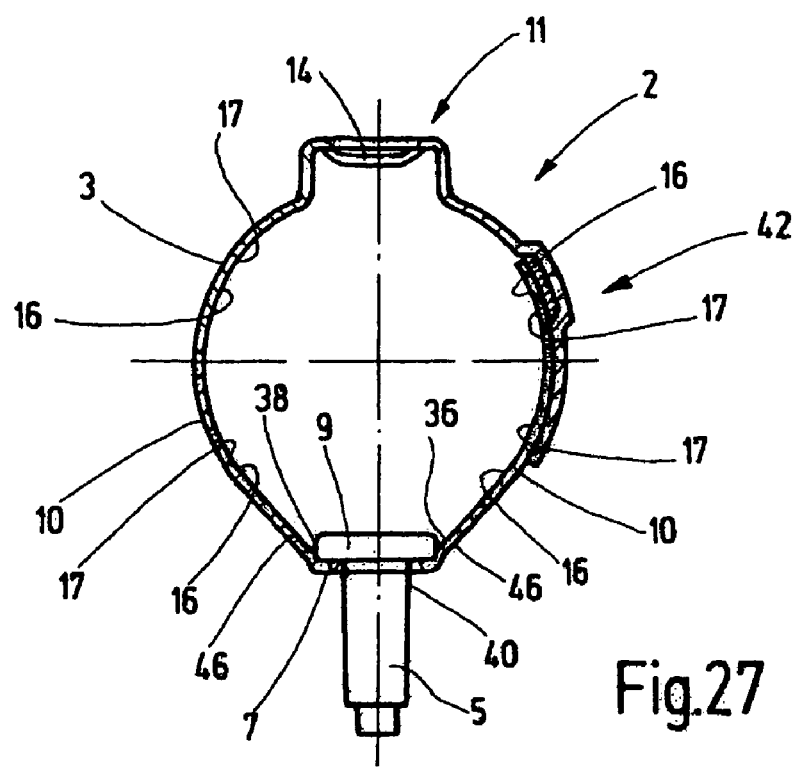
FIG. 27 shows a partially cutaway side view of a retaining clamp, which is fabricated from the clamping ring of FIG. 21, in an undeformed state.
Figure 28:
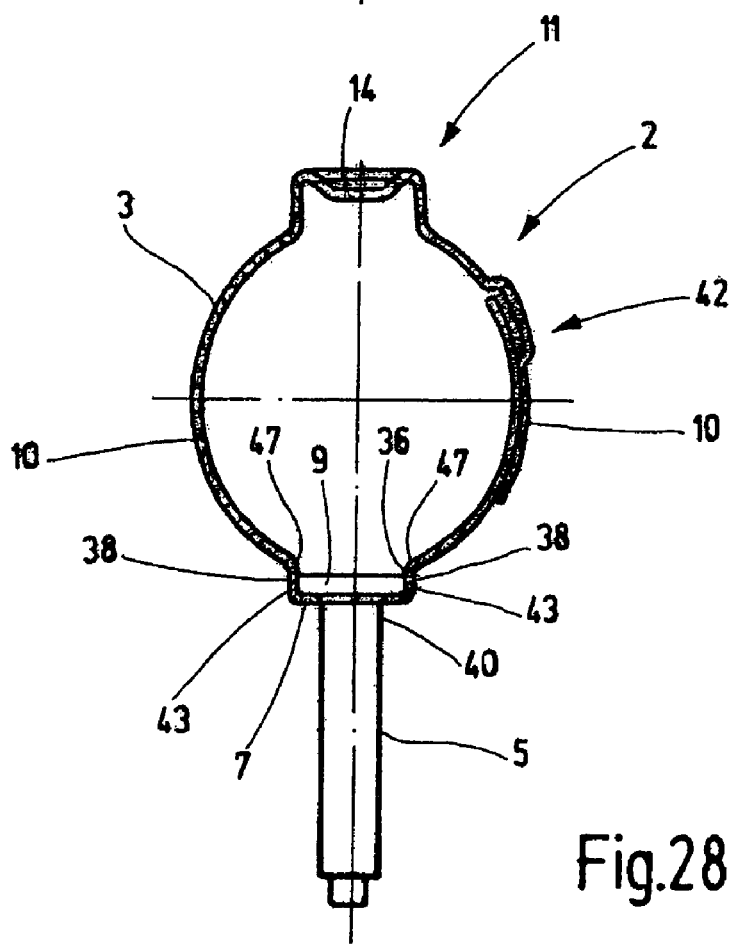
FIG. 28 shows a partially cutaway side view of a retaining clamp, which is fabricated from the clamping ring of FIG. 25, in an undeformed state.
Figure 29:
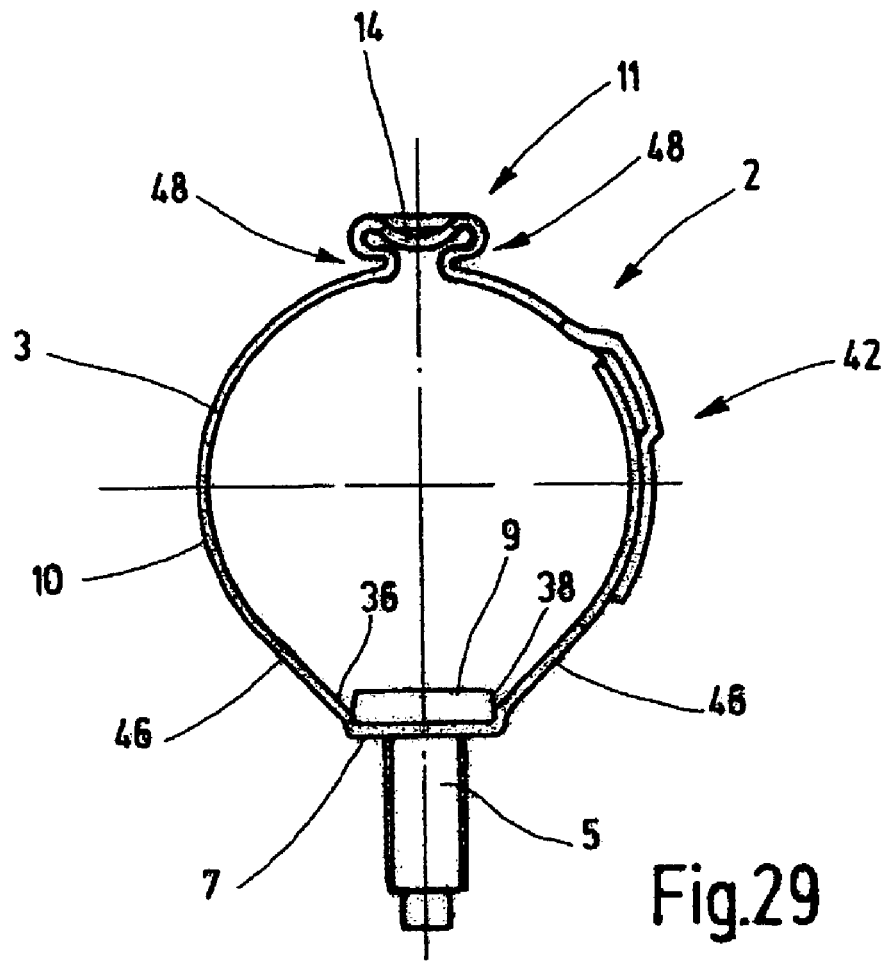
FIG. 29 shows a side view of the retaining clamp from FIG. 27 in a deformed state.

FIGS. 19 to 32 show some further exemplary embodiments of a retaining clamp 2, with FIGS. 19 and 20 and FIGS. 23 and 24 showing, in a top-side and longitudinal-sectional view, two similar retaining clamps 2, before they are bent to form the clamping ring 3, in the form of a punched, essentially planar sheet-metal band 6. FIGS. 21 and 25 show longitudinal sections through the retaining clamps 2 after they have been brought into their annular shape, but without the press-in screw 5, which is illustrated in FIGS. 20 and 24. FIGS. 22 and 26 show, on an enlarged scale, a longitudinal section through the upper region of the two retaining clamps 2 that is provided with the retaining means 11. FIGS. 27 and 28 show the two complete retaining clamps 2 in longitudinal section before they are deformed as a consequence of being clamped firmly on an object, while FIG. 29 shows the retaining clamp from FIG. 27 in a front view after it has been deformed.

As is best illustrated in FIGS. 19 and 23, the punched sheet-metal band 6 which is used in the case of these retaining clamps 2 to bend the clamping ring 3 has a punched-out aperture 30 in one of its end portions. That side of the aperture 30 which faces the adjacent front end of the sheet-metal band 6 is adjoined by a preferably approximately square pressed-out section 31, the dimensions of which correspond in plan view essentially to the dimensions of the aperture 30. As best illustrated in FIGS. 20 and 24, the pressed-out section 31 protrudes over the outside of the clamping ring 3 essentially by the thickness of the sheet-metal band 6.

In the region of its opposite end portion, the sheet-metal band 6 has a further square aperture 32 which has somewhat larger dimensions than the aperture 30. In this aperture 32, a tongue 33 which is formed integrally with the sheet-metal band protrudes in the manner of a lug from the side of the adjacent front end of the sheet-metal band 6. On the side opposite the tongue 33, the aperture 32 is adjoined by a pressed-out section 34 which preferably has a square shape congruent to the square shape of the pressed-out section 31, but is somewhat larger. Like the pressed-out section 31, the pressed-out section 34 also protrudes over the outside of the clamping ring 3, which side is formed by the wide-side surface 35 of the sheet-metal band 6, essentially by the thickness of the sheet-metal band 6, while the tongue 33 extends by the same extent over the inside 36 of the clamping ring 3, which side is formed by the wide-side surface 36 of the sheet-metal band.

It can be gathered from FIGS. 21, 25 and 27 to 29 that, unlike in the case of the previously described exemplary embodiments, the two end portions of the clamping ring 3 do not overlap in the region of the pressed-in screw 5 where they are held together with the pressed-in screw 5. Instead, in order to connect its two end portions, the sheet-metal band 6 is bent together annularly under plastic deformation until the end portions overlap approximately until the tongue 33 bears from the outside against the outside of the pressed-out section 31. The sheet-metal band 6 is subsequently bent together further under elastic deformation until the tongue 33 can be introduced from the outside into the aperture 30. As soon as the tongue 33 enters the aperture, the clamping ring 6 expands again somewhat because of the restoring force of the elastically deformed sheet-metal band 6, the tongue 33 sliding under the pressed-out section 31 until its rear edge strikes against the opposite, front edge of the pressed-out section 31 and further expansion of the clamping ring is prevented. This produces a lock 42 which holds together the end portions of the sheet-metal band 6 forming the clamping ring 3. In the region of the lock 42, the tongue 33 does not protrude over the inside 15 of the end portion lying on the inside and therefore of the clamping ring 3, since there is sufficient space for the tongue 33 under the pressed-out section 31. The pressed-out section 34 in the end portion situated on the outside serves, when the tongue 33 is introduced into the aperture 30, to receive the outwardly protruding pressed-out section 31 in the inner end portion and, in addition, acts in a stiffening manner.

In the case of these exemplary embodiments, the spatial separation of the lock 42 and of the seat of the press-in screw 5 makes it possible for the press-in screw 5 to already be pressed into the still planar sheet-metal band 6, as indicated by the arrow 37 in FIGS. 20 and 24, before the sheet-metal band 6 is bent to form the clamping ring 3.

As can best be seen in FIGS. 19 and 20 and 23 and 24, the press-in screw 5 is pressed there by its stem 5a into an opening 40 of the sheet-metal band 3, which opening is arranged between the two end portions of the sheet-metal band 6 in the vicinity of the aperture 30, so that, after the retaining clamp 2 is completed, the lock 42 is arranged approximately in the centre between the seat of the press-in screw 5 and the clamping means 11 (cf. FIGS. 27 and 28). As is best illustrated in FIGS. 21 and 22 and 25 and 26, before the press-in screw 5 is pressed in, a circumferential edge 41 of the opening 40 protrudes over that wide-side surface 36 of the sheet-metal band 6 which faces the head 9 of the press-in screw 5, with the opening diameter being selected in such a manner that the stem 5a of the press-in screw 5 can readily be introduced. After the head 9 of the screw 5 strikes against the circumferential edge 41 of the opening, a pressure is applied to the head of the screw 5, the pressure being sufficient in order to press the circumferential edge 41 with deformation into the plane of the surrounding base region 7. When the circumferential edge 41 is deformed or leveled, it is pressed in the radial direction against the step 5a of the pressed-in screw, as a result of which a tight fit of the stem 5a of the pressed-in screw 5 in the opening 40 is obtained.

Figure 30:
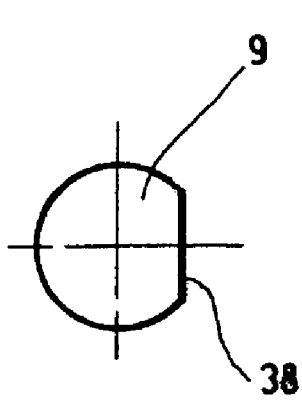
FIGS. 30 to 32 show plan views of various embodiments of a head of the press-in screw.
Figure 31:
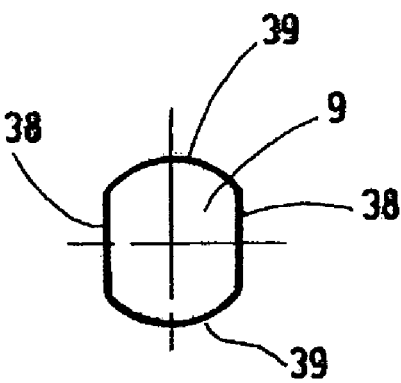
Figure 32:
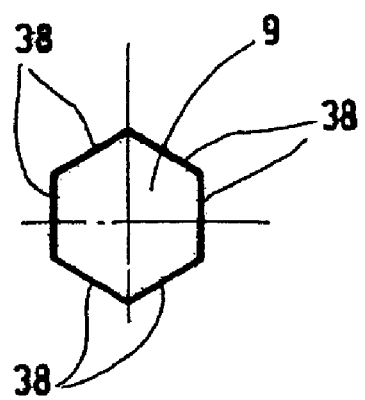

As is best illustrated in FIGS. 30 to 32, the head 9 of the press-in screw 5 is not designed as a round head, but rather has at least one straight rotation-preventing edge 38 which is aligned parallel to a section of the clamping ring 3, which section is adjacent to the seat of the screw head 9, and lies opposite said section at a short distance. As a result, inadvertent rotation of the press-in screw 5 with respect to the clamping ring 3 itself can be prevented if the deformation of the circumferential edge 42 of the passage opening 40 is not sufficient to lock the press-in screw 5 in a rotationally fixed manner. While FIG. 30 shows a head contour which is of circular design over a large part of the circumference and then has a secant-like rotation-preventing edge 38, the head contour of FIG. 31 has two mutually diametrically opposite, arcuate regions 39 and two mutually likewise diametrically opposite straight regions which form the rotation-preventing edges 38. In FIG. 32, there is a hexagon contour of the head 9, with the result that, in all, six rotation-preventing edges 38 are formed.

FIGS. 27 and 28 show the retaining clamps 2 of FIGS. 19 to 22 and 23 to 26 with a pressed-in press-in screw 5 in an undeformed state. It can be clearly seen that, in the case of both exemplary embodiments, the head 9 of the press-in screw 5 bears with its planar lower side against the planar upper side of the base region 7 of the clamping ring 3. In the case of the exemplary embodiment of FIG. 27, the base region 7 of the clamping ring 3 is adjoined on both sides by regions 46 which extend rectilinearly obliquely upward and then merge into annular sections 10 of the clamping ring 3. The base of one or both oblique regions, which base is adjacent to the base region 7, lies opposite a rotation-preventing edge 38 of the screw head 9 at a short distance and thus prevents the rotation of the screw head 9 with respect to the clamping ring 3, as described above.

In the case of the exemplary embodiment of FIG. 28, two sections 43 of the clamping ring 3, which sections are directly adjacent to the base region 7 on both sides, are bent vertically upward from the base region 7, with the result that they extend at a short distance from and parallel to an opposite rotation-preventing edge 38 of the screw head 9, as a result of which the screw head 9 is even better secured against rotation. The sections 43 which are bent away vertically upward merge there via corresponding bent zones 47 directly into the two arcuate sections 10 of the clamping ring 3.

Consequently, the inside 36 of the clamping ring 3 interacts with at least one rotation-preventing edge 38 and preferably with two mutually diametrically opposite rotation-preventing edges 38 of the head 9. As a result, when a securing element, for example a nut, is screwed onto the stem 5a, which is provided with the external thread, of the press-in screw 5, a rotation of the same is prevented even if very great rotational forces are applied to the screw 5, for example when tightening the nut.

FIGS. 19, 20 and 21 and FIGS. 23, 24 and 25 once again also clearly show two possible shapings of the undeformed clamping means 11. As best illustrated in FIGS. 20 and 24, the clamping means 11 has, in cross section, the shape of an inverted U, the base or yoke 13 of which is provided with at least one stiffening web 14 which protrudes toward the inside of the clamping ring 3 and is aligned parallel to the longitudinal axis of the sheet-metal band 6. Whereas, in the case of the exemplary embodiment of FIGS. 19 and 20, there is a single stiffening web 14 arranged on the centre axis of the sheet-metal band 6, the exemplary embodiment of FIGS. 23 and 24 has two stiffening webs 14 which are arranged symmetrically on both sides of the centre axis of the sheet-metal band 6. The stiffening webs 14 are formed by engravings in the sheet-metal band 6 which are of stadium-shaped design in plan view.

FIG. 29 shows, using the example of the retaining clamp 2 which is illustrated in FIGS. 19 to 22 and 27, as the latter is deformed in the region of the clamping means 11, after being pushed onto the gas storage cylinder 1 or onto another cylindrical object, in order to secure it on the circumferential surface thereof. Using a suitable tool, first of all the two cross-sectionally approximately U-shaped limbs of the clamping means 11 are grasped in the vicinity of their lower ends and then pressed inward toward each other (arrows 48), so that the shape which can be seen in FIG. 29 is produced. This reduces the diameter of the clamping ring 3, with the result that an object surrounded is fixed in a clamping manner. The upper side of the head 9 of the press-in screw 5 is always arranged with respect to the circumferential surface of the object in such a manner that the clamped object is either not acted upon there with a clamping force, or is acted upon only with at maximum that clamping force which is also exerted on the object at the contact surfaces of the clamping ring 3.

The invention claimed is:

1. A retaining clamp for securing an object, in particular a gas storage cylinder of an airbag, comprising:
    a clamping ring adapted to encircle the object, the clamping ring being formed of a bent sheet-metal strip and including
        clamping means for tightening the clamping ring about the object by reducing the length of the clamping ring, the clamping means including
            a U-shaped portion having a pair of legs and being adapted to be deformed by bringing inner ends of said legs together, and
            a pair of mutually overlapping end portions each having an opening;
        and a clamping bolt extending through both openings of the clamping ring and having a head disposed inside the clamping ring, the head having a rotation-preventing edge to prevent rotation of the clamping bolt with respect to the inside of the clamping ring.

2. The retaining clamp of claim 1, wherein the head of said clamping bolt has a multi-edged contour.

3. The retaining clamp of claim 1, wherein at least part of an inner surface of the clamping ring is provided with a roughening.

4. The retaining clamp of claim 3, wherein the roughening has a surface roughness of at least approximately 1 µm.

5. The retaining clamp of claim 3, wherein the entire inner surface of the clamping ring is provided with the roughening.

6. The retaining clamp of claim 1, wherein the clamping ring has a stiffening bead extending in the circumferential direction of the clamping ring.

7. The retaining clamp of claim 1, wherein the clamping ring has a flange extending in the circumferential direction of the clamping ring.

8. The retaining clamp of claim 1, wherein the clamping ring has a convex portion between adjacent parts of its inner surface.

* * * * *